United States Patent
Nikami

[11] Patent Number: 5,386,182
[45] Date of Patent: Jan. 31, 1995

[54] APPARATUS FOR DRIVING A STEPPING MOTOR

[75] Inventor: Akira Nikami, Kanagawa, Japan

[73] Assignee: Sony Corporation, Japan

[21] Appl. No.: 61,270

[22] Filed: May 17, 1993

[30] Foreign Application Priority Data

May 21, 1992 [JP] Japan .................. 4-128853

[51] Int. Cl.$^6$ ............................................. H02P 7/29
[52] U.S. Cl. ................................................... 318/293
[58] Field of Search .............. 318/599, 685, 696, 293; 388/809, 811, 816, 819, 828, 829, 830, 831

[56] References Cited

U.S. PATENT DOCUMENTS

| | | | |
|---|---|---|---|
| 4,514,666 | 4/1985 | Suzuki | 318/293 |
| 4,677,356 | 6/1987 | Tsuneda et al. | 318/293 X |
| 4,816,726 | 3/1989 | Novis et al. | 318/293 |
| 4,859,916 | 8/1989 | McCambridge | 318/293 |
| 4,972,130 | 11/1990 | Rossi et al. | 318/293 |
| 4,985,666 | 1/1991 | Nakabayashi | 318/293 X |

FOREIGN PATENT DOCUMENTS 0391574 10/1990 European Pat. Off. .
0422529 4/1991 European Pat. Off. .

OTHER PUBLICATIONS

Electronic Design. vol. 37, No. 21, 12 Oct. 1989, Hasbrouck Heights N.J. pp. 107–112 F. Goodenough 'Power IC Drives Motors and Solenoids'.

Primary Examiner—Bentsu Ro
Attorney, Agent, or Firm—Ronald P. Kananen

[57] ABSTRACT

A motor driving PWM signal generating circuit (1) includes a read-only memory (ROM) (2) in which there is stored data of a PWM signal corresponding to 0 to 180 degrees of a sine wave. A signal representative of an arbitrary rotary phase is supplied to the generating circuit (1) which generates a PWM output signal having a duty ratio of 50% to 100% corresponding to a sine wave of, for example, 0° to 180° degrees. Also, the generating circuit (1) generated signals representative of 0° to 180° degrees of the rotary phase and 180° to 360° degrees of the rotary phase as DIR output signals. The PWM signal and the DIR output signal from the generating circuit (1) are supplied to an exclusive-OR circuit (3). A signal from the exclusive-OR circuit (3) is supplied to an IN input of an H-type bridge driver circuit (4). Therefore, a level difference portion (crossover distortion) on the inverted portion of the driving signal can be removed and the motor can be driven smoothly without discontinuity.

13 Claims, 5 Drawing Sheets

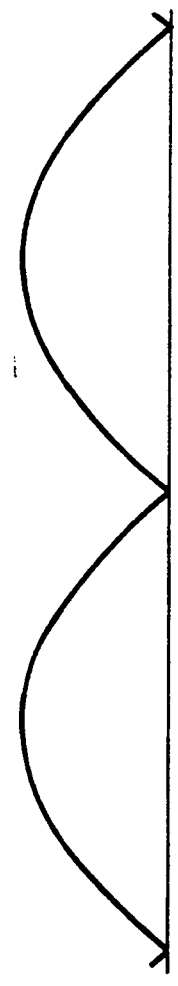
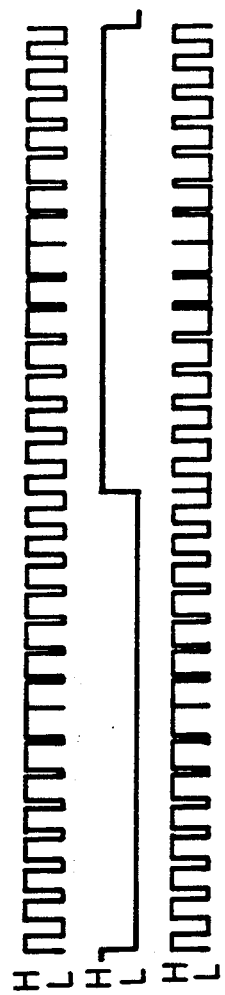
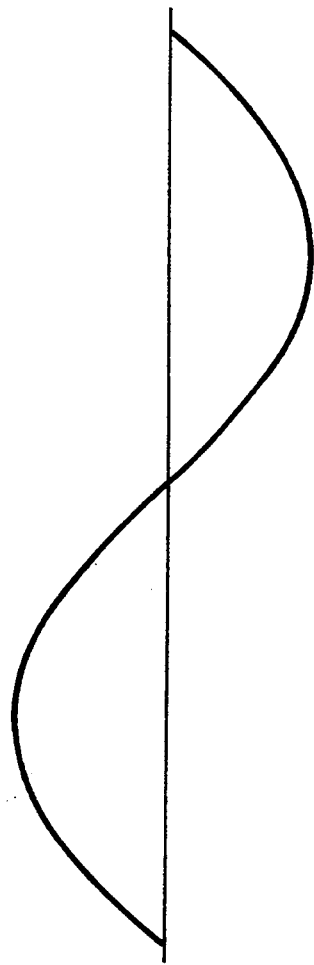
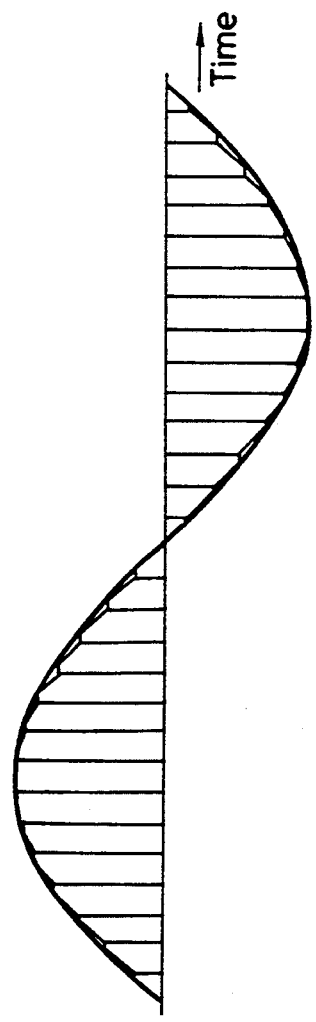
FIG. 6A
FIG. 6B
FIG. 6C
FIG. 6D
FIG. 6E
FIG. 6F
FIG. 6G

FIG. 7A PWM
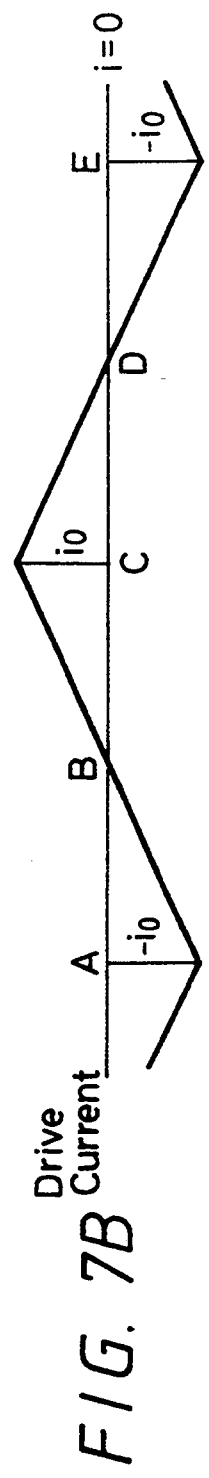
FIG. 7B Drive Current

APPARATUS FOR DRIVING A STEPPING MOTOR

BACKGROUND OF THE INVENTION

1. Field of the Invention

The present invention relates to a motor driving apparatus for use in a zoom drive motor of a consumer video camera or the like.

2. Description of the Prior Art

A conventional motor driving apparatus for use in a zoom drive motor of a consumer video camera, for example, is shown in FIG. 1 of the accompanying drawings.

As shown in FIG. 1, a PWM (pulse width modulation) signal generating circuit 41 which derives a PWM signal for driving a motor is provided. The PWM signal generating circuit 41 includes a read-only memory (ROM) 42 in which data of a PWM signal corresponding to a sine wave, for example, is stored. When supplied with a signal representative of an arbitrary rotary phase, the PWM signal generating circuit 41 generates a PWM output signal corresponding to the sine wave.

The PWM output signal from the PWM signal generating circuit 41 is supplied to an EN input of an H-type bridge driver circuit 43. A DIR 1 output signal that corresponds to a motor driving direction is generated from the generating circuit 41. The DIR 1 output signal from the generating circuit 41 is supplied to an IN 1 input of the H-type bridge driver circuit 43.

A and B outputs of the H-type bridge driver circuit 43 are supplied to respective wire ends of a coil 45 of a motor (M) 44. The coil 45 of a the motor 44 is of two-phase type and therefore the PWM output signal and the DIR output signal from the generating circuit 41 and EN, IN inputs and A, B outputs of the H-type bridge driver circuit 43 are each generated in the form of two channels as shown in FIG. 1.

The H-type bridge driver circuit 43 generates the A and B outputs for the EN and IN inputs as shown in the following truth table 1.

TABLE 1

| Case | IN1 (IN2) | EN1 (EN2) | A1 (A2) | B1 (B2) |
|---|---|---|---|---|
| 1 | L | H | L | H |
| 2 | H | H | H | L |
| 3 | L | L | Hi-Z | Hi-Z |
| 4 | H | L | Hi-Z | Hi-Z |

(Hi-Z: High Impedance)

The above-mentioned truth table 1 will be described in association with operation of a typical circuit. The H-type bridge driver circuit 43 is arranged as shown in FIG. 2, for example. FIG. 2 shows only one phase side of the coil 45 of the motor 44, and the coil 45 is represented by a series circuit 51 of a coil and a resistor.

As shown in FIG. 2, one end A of the series circuit 51 is connected through a first switch $S_1$ and a diode $D_1$ to a drive voltage source 52 and is also grounded via a second switch $S_2$ and a diode $D_2$. The other end B of the series circuit 51 is connected through a third switch $S_3$ and a diode $D_3$ to the drive voltage source 52 and is also grounded via a fourth switch $S_4$ and a diode $D_4$. The switches $S_1$ to $S_4$ may be replaced with ICs, such as transistors or the like, in actual practice.

In the H-type bridge driver circuit 43, a set of diagonally located switches $S_1$ and $S_4$ and a set of diagonally located switches $S_2$ and $S_3$ are driven commonly. When the EN input is at high potential (H) and the IN input is at high potential (H), i.e., in the case 2 of the truth table 1, a set of switches $S_1$ and $S_4$ are turned on and a set of switches $S_2$ and $S_3$ are turned off so that voltages of A1, A2 and B1, B2 go to high (H) level and low (L) level as shown on the truth table 1, causing an electric current to flow from one end A to the other end B. When the EN input is at high potential (H) and the IN input is at low potential (L), i.e., in the case 1 of the truth table 1, a set of the switches $S_2$ and $S_3$ are turned on and a set of the switches $S_1$ and $S_4$ are turned off so that voltages of the A1, A2 and B1, B2 go to low (L) level and high (H) level as shown on the truth table 1, causing an electric current to flow from the other end B to one end A. Further, when the EN input is at low potential (L), i.e., in the cases 3 and 4 of the truth table 1, the switches $S_1$ to $S_4$ are all turned off so that the voltages of A1, A2 , B1 and B2 are all set in the high impedance (Hi-Z) state as shown on the truth table 1.

Accordingly, the aforesaid PWM output signal is supplied to the EN input of the H-type bridge driver circuit 43 and the DIR output signal is supplied to the IN input of the H-type bridge driver circuit 43, whereby an average electric current corresponding to the PWM output signal is supplied to the coil 45 of the motor 44 in the direction represented by the DIR output signal, thereby driving the motor 44.

FIG. 3 shows a relationship between a duty ratio of the PWM signal and an average electric current. That is, a characteristic of average current becomes nonlinear in the portion where the duty ratio of the PWM signal is less than 58%. Therefore, it is customary that the position at which the duty ratio is less than 58% is regarded as "0" and the electric current is inverted at this position "0" in the reverse direction to drive the motor.

When the electric current is inverted in the reverse direction at the position where the duty ratio is 58%, then the waveform of a drive signal becomes as shown in FIG. 4. As a consequence, the average value of the motor driving current does not become zero completely in the vicinity of the inverted portion, causing a level difference portion (i.e., crossover distortion) to occur in the inverted portion. Therefore, the motor cannot be driven smoothly at the portion where the crossover distortion occurs, which leads to disadvantages such as the occurrence of noise or the like.

When the motor is utilized, in particular, as the zoom drive motor of consumer video cameras or the like, then the occurrence of such noise becomes a serious problem because a microphone capsule for collecting sound or the like is usually disposed near the zoom drive motor.

OBJECTS AND SUMMARY OF THE INVENTION

Therefore, it is an object of the present invention to provide an improved motor driving apparatus in which the aforesaid shortcoming and disadvantages of the prior art can be eliminated.

More specifically, it is an object of the present invention to provide a motor driving apparatus in which crossover distortion can be prevented from occurring at an inverted portion of a drive signal so that a motor can be driven smoothly.

It is another object of the present invention to provide a motor driving apparatus for use in a stepping motor such as a zoom drive motor of a consumer video camera.

According to an aspect of the present invention, there is provided a motor driving apparatus which comprises a bridge driver circuit in which an electric current supplied to a coil of a motor is inverted in response to a high potential and a low potential of an input signal, the bridge driver circuit for driving the motor; a circuit for generating a PWM (pulse width modulation) signal having a duty ratio of 0% to 100% corresponding to a drive waveform; and a circuit for supplying the PWM signal to the bridge driver circuit as the input signal.

Therefore, according to the motor driving apparatus of the present invention, since the motor is driven such that an electric current supplied to a coil of the motor is inverted in direction in response to the PWM signal having a duty ratio of 0% to 100%, crossover distortion can be prevented from occurring at the inverted portion of the drive signal. Hence, the motor can be driven smoothly without discontinuity.

The above and other objects, features, and advantages of the present invention will become apparent in the following detailed description of an illustrative embodiment thereof to be read in conjunction with the accompanying drawings.

BRIEF DESCRIPTION OF THE DRAWINGS

FIGS. 6A through 6G are diagrams used to explain operation of the motor driving apparatus shown in FIG. 5, respectively; and FIGS. 7A and 7B are diagrams used to explain the present invention, respectively.

DETAILED DESCRIPTION OF THE PREFERRED EMBODIMENT

The present invention will now be described with reference to the drawings.

Figure 1:
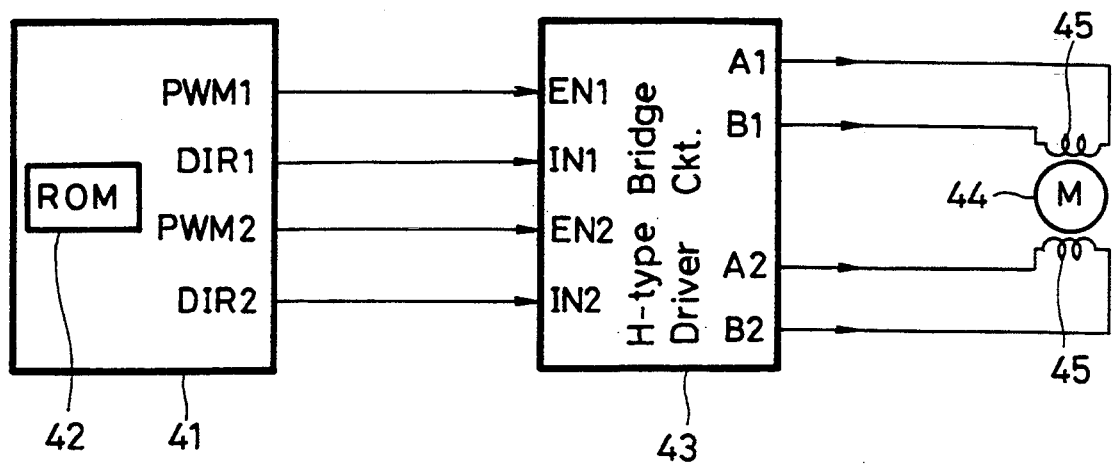
FIG. 1 is a block diagram showing a circuit arrangement of a conventional motor driving apparatus.
Figure 2:
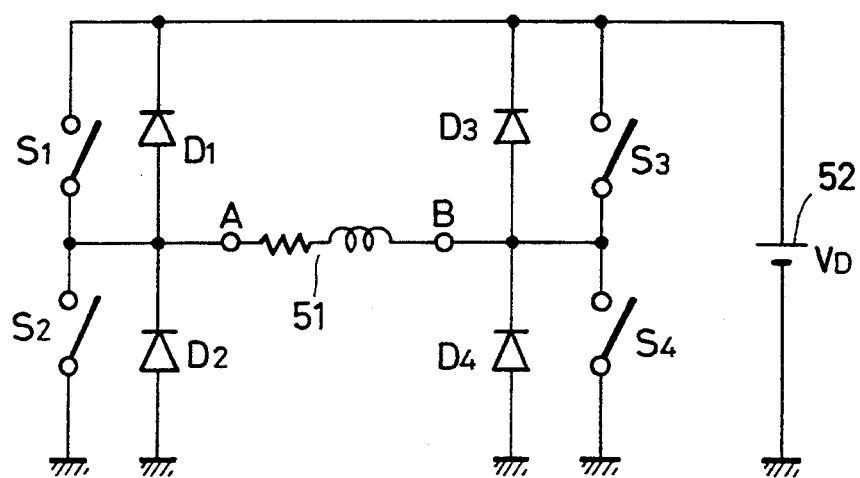
FIG. 2 is a diagram showing a circuit arrangement of an H type bridge driver circuit used in the conventional motor driving apparatus shown in FIG. 1.
Figure 3:
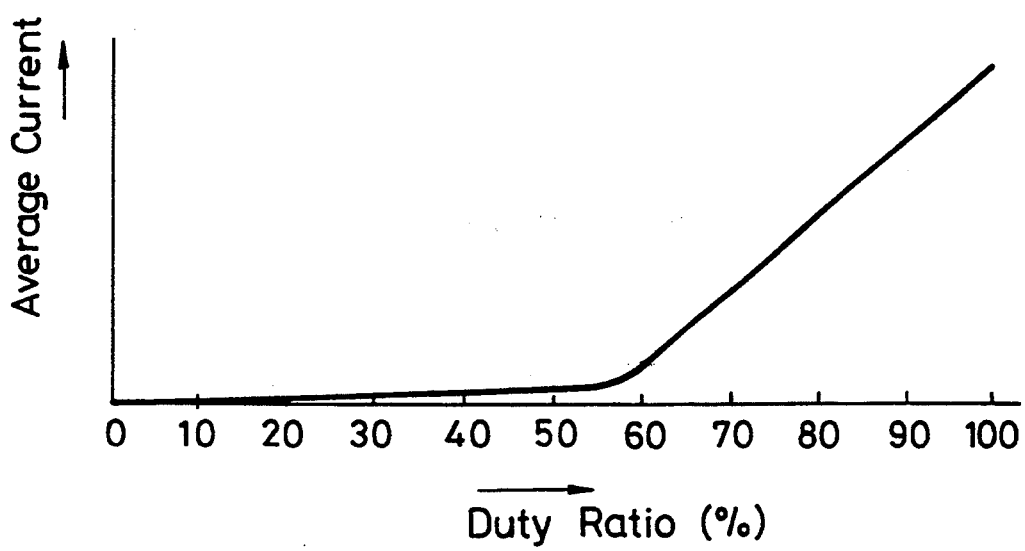
FIG. 3 is a graph showing a relationship between a duty ratio of a PWM signal and an average electric current, and to which references will be made in explaining the conventional motor driving apparatus.
Figure 4:
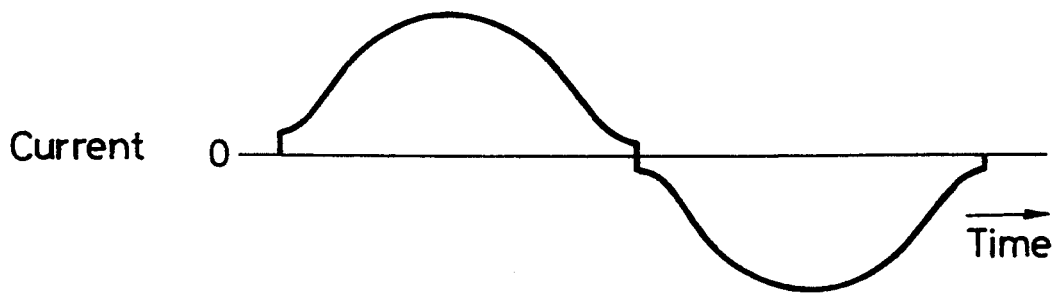
FIG. 4 is a diagram of a waveform of a drive signal, and to which references will be made in explaining the conventional motor driving apparatus.
Figure 5:
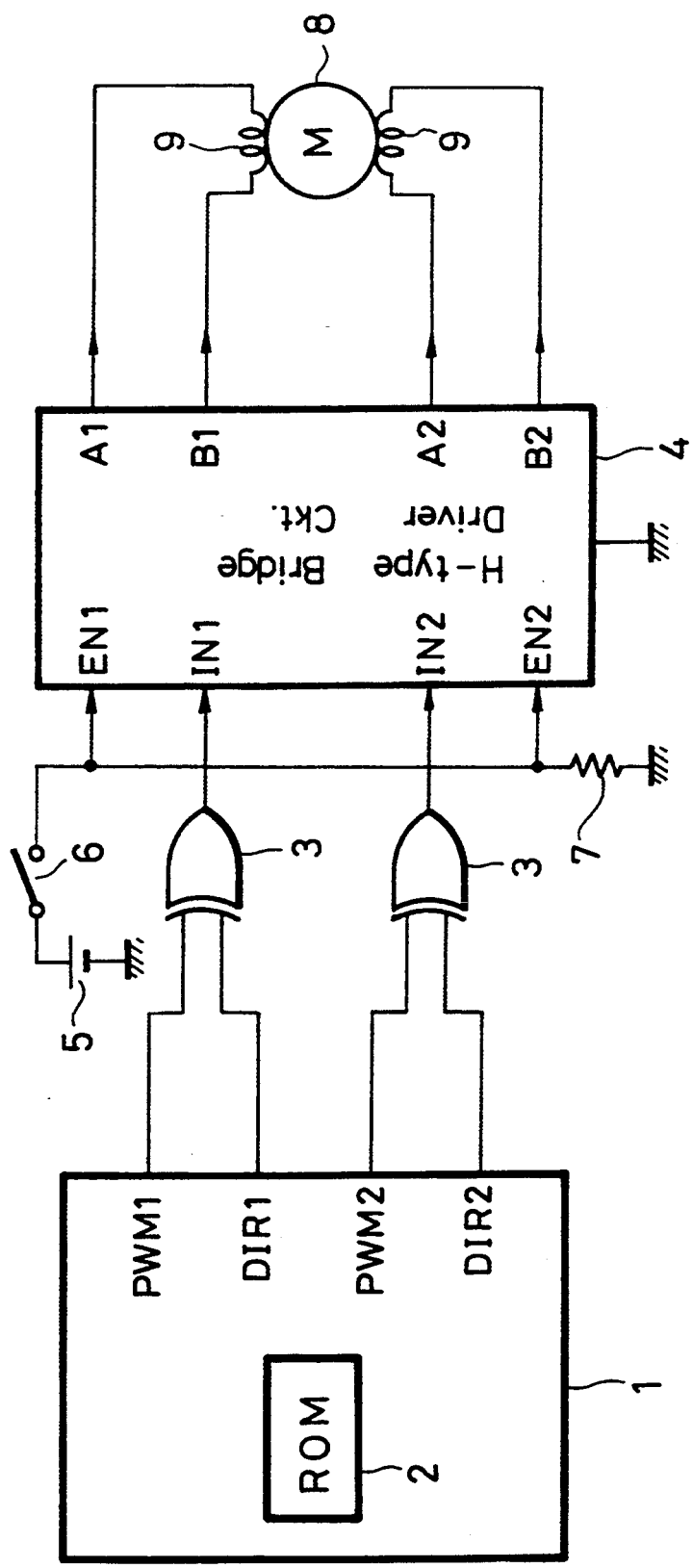
FIG. 5 is a block diagram showing a circuit arrangement of a motor driving apparatus according to an embodiment of the present invention.

FIG. 5 shows in block form a circuit arrangement of a motor driving apparatus according to an embodiment of the present invention.

As shown in FIG. 5, a PWM signal generating circuit 1 which generates a PWM signal for driving the motor is provided. The PWM signal generating circuit 1 includes a ROM 2 in which data of a PWM signal corresponding to a period of 0° to 180° of a sine wave is stored.

When supplied with a signal representative of an arbitrary rotary phase, the PWM signal generating circuit 1 generates a PWM output signal having a duty ratio of 50% to 100% corresponding to a sine wave of a period of 0° to 180°. Further, the PWM signal generating circuit 1 derives signals representative of a period having a rotary phase of 0° to 180° and a period having a rotary phase of 180° to 360° as DIR output signals.

The PWM output signals and the DIR output signals from the generating circuit 1 are supplied to exclusive-OR circuits 3. Outputs from the exclusive-OR circuits 3 are supplied to IN inputs of an H-type bridge driver circuit 4. A voltage from a voltage source 5 is grounded through a switch 6 and a resistor 7, and a voltage (high potential (H)) across the resistor 7 is input to EN inputs of the H-type bridge driver circuit 4.

The arrangement of the H-type bridge driver circuit 4 is equivalent to that of the aforesaid H-type bridge driver circuit 43. Therefore, in the H-type bridge driver circuit 4, when a high potential (H) is supplied to the EN input in accordance with the above-mentioned truth table 1 under normal condition, if the PWM output signal that is supplied to the IN input is at high potential (H), a set of the switches $S_1$ and $S_4$ are turned on and a set of the switches $S_2$ and $S_3$ are turned off. Also, when the PWM signal is at low potential (L), a set of the switches $S_2$ and $S_3$ are turned on and a set of the switches $S_1$ and $S_4$ are turned off.

The H-type bridge driver circuit 4 derives A and B outputs in accordance with the above-mentioned truth table 1 and the A and B outputs are supplied to respective wire ends of a coil 9 of a motor 8. In FIG. 5, since the coil 9 of the motor 8 is formed as a two-phase coil, the PWM output signal and the DIR output signal from the generating circuit 1, the exclusive-OR circuit 3 and EN, IN inputs and A, B outputs from the H-type bridge driver circuit 4 are each provided in the form of two channels.

In this apparatus, the PWM output signal from the generating circuit 1 is a signal having a duty ratio of 50% to 100% (see FIG. 6B) corresponding to a period of 0° to 180° of a sine wave shown in FIG. 6A. The DIR output signal shown in FIG. 6C is output from the generating circuit 1, whereby the exclusive-OR circuit 3 derives a signal whose duty ratio is in a range from 0 to 100% as shown in FIG. 6D. This signal corresponds to a period of 0° to 360° of a sine wave shown in FIG. 6E.

A signal from the exclusive-OR circuit 3 is supplied to the IN input of the H-type bridge driver circuit 4. Also, a signal that is held at high potential (H) upon operation as shown in FIG. 6F is supplied to the EN input of the H-type bridge driver circuit 4, whereby a drive electric current shown in FIG. 6G is supplied through the A and B outputs to the coils 9 of the motor 8.

In the H-type bridge driver circuit 4, the electric current that is supplied to the coils 9 of the motor 8 is inverted in response to the high potential or low potential of the signal supplied to the IN input of the H-type bridge driver circuit 4. Therefore, in the vicinity of the portion in which the duty ratio of the signal supplied to the IN input is 50% as shown in FIG. 7A, the drive electric current supplied to the coil 9 becomes as shown in FIG. 7B and an average value of the electric current becomes "0".

Accordingly, in this motor driving apparatus, the crossover distortion can be prevented from being produced in the inverted portion of the drive signal. Hence, the motor can be driven smoothly without discontinuity.

As described above, since the aforesaid motor drive apparatus is driven such that the electric current supplied to the coils of the motor is inverted in direction in response to the PWM signal having the duty ratio of 0% to 100%, the crossover distortion can be prevented from being produced at the inverted portion of the drive signal. Hence, the motor can be driven smoothly without discontinuity.

The driving waveform corresponding to the period of 0° to 180° derived from the above-mentioned generating circuit 1 need not be stored in the ROM 2 but instead data representative of the driving waveform corresponding to the period of 0° to 180° may be formed by inverting the read-out direction of a memory that stores therein data of a driving waveform representative of a period of 0° to 90° formed of the PWM signal having a duty ratio of 50% to 100%.

According to the present invention, since the electric current supplied to the coils of the motor is inverted in direction in response to the PWM signal having the duty ratio of 0% to 100%, the crossover distortion can be prevented from being produced at the inverted portion of the drive signal. Hence, the motor can be driven smoothly without discontinuity.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A motor driving apparatus comprising:
    a bridge driver circuit in which an electric current supplied to a coil of a motor is inverted in direction in response to a high potential and a low potential of an input signal, said bridge driver circuit for driving said motor;
    means for generating a pulse width modulation (PWM) signal having a duty ratio of 0% to 100% corresponding to a drive waveform; and
    means for supplying said PWM signal to said bridge driver circuit as said input signal,
    wherein said PWM signal having a duty ratio of 0% to 100% is formed by processing drive waveform data of a period of 0° to 180°, formed from a PWM signal having a duty ratio of 50% to 100% and signals representative of a period of 0° to 180°, and a period of 180° to 360° in an exclusive-OR fashion.

2. A motor driving apparatus according to claim 1, wherein said bridge driver circuit is an H-type bridge driver circuit.

3. A motor driving apparatus according to claim 1, wherein said drive waveform data of the period of 0° to 180° is formed by inverting a read-out direction of a memory having drive waveform data of a period of 0° to 90° formed of a PWM signal having a duty ratio of 50% to 100%.

4. A motor driving apparatus, comprising:
    a bridge driving circuit means for driving a motor by providing current from a pair of output terminals A, B to a coil of said motor in response to input signals to input terminals EN, IN;
    means for generating both a pulse width modulating (PWM) signal having a duty ratio of from 50 to 100% corresponding to a driving waveform having a rotary phase from 0° to 180° and a DIR signal for a period having a rotary phase of 180° to 360°;
    a logic circuit receiving said PWM and DIR signals and providing an output signal having a duty ratio from 0 to 100% corresponding to a period having a rotary phase of 0° to 360° to said IN input terminal of said bridge driving circuit means; and
    a source of reference potential providing an output to said EN input terminal of said bridge driving circuit means.

5. A motor driving apparatus as set forth in claim 4 wherein said logic circuit is an exclusive-OR circuit.

6. A motor driving apparatus as set forth in claim 4 wherein said bridge driving circuit means is an H-type bridge driver circuit.

7. A motor driving apparatus as set forth in claim 6 wherein said H-type bridge driver circuit includes a plurality of switches $S_1$ to $S_4$.

8. A motor driving apparatus as set forth in claim 4 wherein said bridge driving circuit means includes at least a pair of EN input terminals, a pair of IN input terminals, a pair of A output terminals, and a pair of B output terminals, wherein said A and B output terminals being respectively connected to opposing ends of a coil of said motor.

9. A motor driving apparatus as set forth in claim 8 wherein when a high potential is supplied to one of the EN input terminals, if the PWM output signal that is supplied to one of the IN input terminals is at a high potential, a set of switches $S_1$ and $S_4$ are turned on and a set of switches $S_2$ and $S_3$ are turned off, and if the PWM output signal that is supplied to one of the IN input terminals is at a low potential, the switches behave oppositely.

10. A motor driving apparatus, comprising:
    a pulse width modulating (PWM) signal generating circuit having a read-only memory (ROM) in which data of a PWM signal corresponding to 0° to 180°degrees of a sine wive is stored, said PWM signal generating circuit generating a PWM output signal having a duty ratio of 50% to 100% corresponding to a sine wave of about 0° to 180° degrees, said PWM signal generating circuit also generating signals representing of 0° to 180° degrees of a rotary phase and 180°to 360° degrees of a rotary phase as drive (DIR) signals;
    an exclusive-OR circuit receiving said PWM output signals and said DIR signals from said PWM signal generating circuit and providing IN outputs representative thereof; and
    an H-type bridge driver circuit having IN inputs for receiving the IN outputs from said exclusive-OR circuit and EN inputs for receiving an input voltage from a voltage source, thus to provide an output driving signal to a motor wherein a level difference portion on an inverted portion of the output driving signal is removed and the motor is driven smoothly without discontinuity.

11. A motor driving apparatus as set forth in claim 10 wherein said bridge driver circuit includes at least a pair of EN input terminals, a pair of IN input terminals, a pair of A output terminals, and a pair of B output terminals, wherein said A and B output terminals being respectively connected to opposing ends of a coil of said motor.

12. A motor driving apparatus as set forth in claim 11 wherein said H-type bridge driver circuit includes a plurality of switches $S_1$ to $S_4$.

13. A motor driving apparatus as set forth in claim 12 wherein when a high potential is supplied to one of the EN input terminals, if the PWM output signal that is supplied to one of the IN input terminals is at a high potential, a set of switches $S_1$ and $S_4$ are turned on and a set of switches $S_2$ and $S_3$ are turned off, and if the PWM output signal that is supplied to one of the IN input terminals is at a low potential, the switches behave oppositely.

* * * * *